United States Patent [19]

Jesse

[11] Patent Number: 5,306,026
[45] Date of Patent: Apr. 26, 1994

[54] RESCUE TOBOGGAN

[76] Inventor: Terry A. Jesse, 21629 E. Fairwinds, Diamond Bar, Calif. 91765

[21] Appl. No.: 970,010

[22] Filed: Nov. 2, 1992

[51] Int. Cl.⁵ .................. B62B 13/06; B62B 17/06
[52] U.S. Cl. ............................... 280/18; 280/19; 280/24; 280/28.16; 5/625; 5/626; 5/662
[58] Field of Search ............... 280/18, 19.1, 20, 24, 280/27, 28, 28.12, 28.16, 609, 625, 626, 662

[56] References Cited

U.S. PATENT DOCUMENTS

| | | | |
|---|---|---|---|
| Re. 28,620 | 11/1975 | Jordan et al. | 5/626 X |
| 2,175,748 | 10/1939 | Dunn | 280/18 |
| 2,770,465 | 11/1956 | Dandurand | 280/27 X |
| 3,027,575 | 4/1962 | Fortin | 280/609 X |
| 3,199,887 | 8/1965 | McKelvey | 280/8 |
| 3,202,437 | 8/1965 | Masbruch | 280/18 |
| 3,222,080 | 12/1965 | Kinraide | 280/18 |
| 3,921,239 | 11/1975 | Sovia et al. | 280/18 X |
| 4,079,953 | 3/1978 | Howarth, Jr. | 280/20 X |
| 4,347,635 | 9/1982 | Eisenhauer | 280/18 X |
| 4,389,066 | 6/1983 | Weir et al. | 280/19.1 X |
| 4,403,785 | 9/1983 | Hottel | 280/609 X |
| 4,717,362 | 1/1988 | Kraft | 280/18 X |

FOREIGN PATENT DOCUMENTS

| | | | |
|---|---|---|---|
| 1541313 | 7/1969 | Fed. Rep. of Germany | 5/625 |
| 1441882 | 1/1966 | France | 5/625 |
| 258980 | 6/1949 | Switzerland | 280/18 |

*Primary Examiner*—Brian L. Johnson
*Attorney, Agent, or Firm*—Poms, Smith, Lande & Rose

[57] ABSTRACT

A flexible toboggan is modified for use as a rescue toboggan. A backboard is located within said rescue toboggan and a CPR Bracket located above said backboard so that a rescuer can perform CPR or otherwise monitor an injured person who is strapped to the backboard and placed in the rescue toboggan. Concave recesses in the front, lower portion of the rescue toboggan reduce the sliding resistance of the rescue toboggan when the rescue toboggan is empty.

16 Claims, 4 Drawing Sheets

RESCUE TOBOGGAN

FIELD OF THE INVENTION

The present invention generally relates to rescue equipment, and more specifically to equipment used to transport an injured person.

BACKGROUND OF THE INVENTION

In emergency medical situations, it is desirable to immediately apply first aid techniques to an injured person, and to transport the injured person as soon as practical to a health care facility such as a hospital, trauma center, or the like. Numerous studies have shown that the faster an injured person is transported to a care facility, the greater the chance of survival and the greater the chance that the injuries can be minimized, eliminating permanent damage to the injured person. In this regard, numerous advances have occurred in the industry in order to accelerate the transportation of an injured person to a care facility. These techniques have focused on rapid transportation of emergency personnel to the site of the injured person, and rapid transportation of the injured person from the site.

Techniques for transporting the injured person from the cite to a care facility include the extensive use of helicopters to airlift an injured person, thus reducing the travel time required to reach the health care facility. Helicopter transportation techniques have been used in both mountainous terrain in which transporting an injured person may take an extended period of time during travel over rough terrain, and transportation from vehicle crash cites located on freeways or city streets where transportation may be effected by ambulance or conventional vehicles.

There are many areas which are generally inaccessible to standard vehicles and require the use of specialized equipment in order to extract an injured person and transport the injured person to a care facility. These areas typically include the sides of mountains which require the use of repelling ropes in order to extract climbers who have become injured, or hillsides which may require the use of specially tracked vehicles in order to safely negotiate the hillside and transport an injured person.

A variety of tracked vehicles are used in many countries to extract the injured person of accidents from snow covered hillsides, such as ski resorts. One of the difficulties in employing tracked vehicles is the considerable expense of purchasing and maintaining a tracked vehicle and the number of vehicles which may be required in order to provide sufficient transportation capabilities to remove an injured person from a hillside and subsequently transport them to a care facility.

In order to alleviate this problem, a variety of rescue toboggans have been employed at ski resorts. Rescue toboggans are relatively inexpensive, are easily transported on a regular ski lift, and are highly mobile as they can be maneuvered by a ski patrol or ski rescuer to the site of the injured person. This same mobility allows a ski patrol or ski rescuer to readily extract or injured person from a hillside or mountain side. Frequently, injuries occur in areas which may be inaccessible when a tracked vehicle is employed, but may be accessible to a ski patrol or ski rescuer employing a rescue toboggan.

Rescue toboggans are typically constructed of a light weight material such as fiberglass and have tie downs so that an injured person can be placed in the toboggan, strapped in place and transported off the hill or mountain where they can be placed in a vehicle or helicopter and transported to an emergency care facility. The toboggans employed are typically extremely useful for certain types of injuries, such as ankle sprains, broken arms, shoulder separations, minor leg brakes, and the like, where the injured person can be readily moved into and out of the rescue toboggan without the risk of extensive additional injury. Typically, rescue toboggans are designed to have a width slightly greater than the width of the injured person which they may be transporting and a length slightly longer than the length of the injured person they may be transporting.

Once the injured person has been loaded into a rescue toboggan and encountered a sufficient risk of additional injury by being placed in a rescue toboggan, it will become necessary to extract the injured person from the rescue toboggan and place the injured person on a stretcher, backboard, or apparatus for transportation to an emergency facility. This transportation may be accomplished by ground vehicles, such as an ambulance or by helicopter, depending on the needs of the injured person and the time required to transport the injured person to an emergency facility.

In a variety of conditions, especially as more severe injuries are incurred, the available rescue toboggans become difficult to use without risking additional, and possibly more extensive injury to the injured person. This is especially true for spinal or neck injuries where a minimum amount of movement of the injured person is preferred in order to avoid aggravating or stressing a particular injured area.

Additional difficulties are encountered if it is necessary for more than one individual to ride in a rescue toboggan at one time. This situation may occur in the case of cardiac or respiratory arrest or with other chest injuries in which there is a significant risk that an injured person may stop breathing, or the injured person, heart may stop beating. In these situations, the typical approach has been to lash or fasten two rescue toboggans together, possibly at right angles to each other, and have a rescuer crouched or kneeling along side the injured person to monitor the status of the injured person or provide cardiopulmonary resuscitation (CPR) and/or to ventilate the injured person.

A need therefore exists for a rescue toboggan which can accommodate both an injured person and a rescuer. A need further exists for a rescue toboggan which is designed such that the injured person does not need to be disturbed while being extracted from the rescue toboggan.

SUMMARY OF THE INVENTION

It is therefore an object of the present invention to provide a rescue toboggan in which an injured person can be inserted and removed from the rescue toboggan without disturbing the physical position of the injured person as the injured person is inserted into or extracted from the rescue toboggan.

It is a further object of the present invention to provide a rescue toboggan in which a rescuer can readily travel in conjunction with an injured person.

It is a further object of the present invention to provide a rescue toboggan in which a rescuer can readily perform CPR on an injured person during transport of the injured person.

It is a further object of the present invention to provide a rescue toboggan which makes the use of emergency oxygen readily available to a rescuer who may be performing CPR, or may be tending to an injured person who is suffering respiratory arrest.

It is a further object of the present invention to provide a rescue toboggan which contains a removable stretcher or backboard such that the injured person may be placed on the stretcher or backboard prior to being inserted into the rescue toboggan.

It is a further object of the present invention to provide a rescue toboggan which can be rapidly and safely transported by one or more rescuers down a hillside while the rescue toboggan contains an injured person and rescuer.

It is a further object of the present invention to provide a rescue toboggan which is stable and will resist flipping, rolling, or otherwise deviating from the course dictated by the rescuer steering the rescue toboggan.

It is a further object of the present invention to provide a rescue toboggan which has a lower sliding resistance when empty than it does when occupied by an injured person and/or rescuer.

One embodiment of the present invention employs a rescue toboggan which is oversize in both length and width as compared to standard rescue toboggans. The oversize rescue toboggan contains a backboard which is held in place by a variety of mechanical stops and straps. The backboard may be removed from the rescue toboggan, an injured person placed on the backboard, and the backboard inserted into the rescue toboggan. The rescue toboggan also contains an oxygen bottle and preferably a demand regulator. The width of the rescue toboggan is such that a rescuer may kneel over the injured person when the injured person is placed in the rescue toboggan and apply CPR to the injured person during transportation of the injured person in the rescue toboggan. The rescuer in the toboggan preferably leans over a support bar located above the injured person, and may be strapped into the rescue toboggan so that the rescuer may concentrate fully on performing CPR or ventilating the injured person without worrying about maintaining the rescuers balance or position within the rescue toboggan.

An embodiment of the rescue toboggan contains concave segments located towards the front of the toboggan in order to reduce the surface area of the toboggan which may be in contact with snow, ice, or another substance beneath the toboggan when the toboggan is empty. This concave area becomes flat or convex when an injured person and/or rescuer is placed within the rescue toboggan.

A removable backboard affixed to the rescue toboggan enables the injured person to be readily removed from the rescue toboggan and placed on a standard stretcher without disturbing or rearranging the position of the injured person or ceasing CPR.

The above-described objects of the present invention and other features and benefits of the present invention will become clear to those skilled in the art when read in conjunction with the following detailed description of a preferred embodiment and viewed in conjunction with the attached drawings and appended claims.

DETAILED DESCRIPTION OF A PREFERRED EMBODIMENT

Referring to FIGS. 1-5, there is shown an embodiment of the rescue toboggan 12 which contains a backboard 32, and an oxygen bottle 62. Backboard 32 is held in place within the toboggan 12 by tie down straps 50 and runners 44 and 46 in conjunction with spacers 40 and 42 and bracket 34. Runners 44 and 46 and spacers 40 and 42 can be more clearly seen in FIGS. 3 and 4. Runners 44 and 46 of backboard 32 run the length of the backboard, but may be limited to a shorter area immediately adjacent to spacers 40 and 42. By placing runners 44 and 46 on either side of spacers 40 and 42, lateral movement of the backboard 32 within the rescue toboggan 12 is eliminated. Tie down straps 50 and 52 prevent the backboard 32 from raising up off the bottom of rescue toboggan 12, thereby ensuring that runners 44 and 46 maintain their relative position with respect to spacers 40 and 42.

Figure 1:
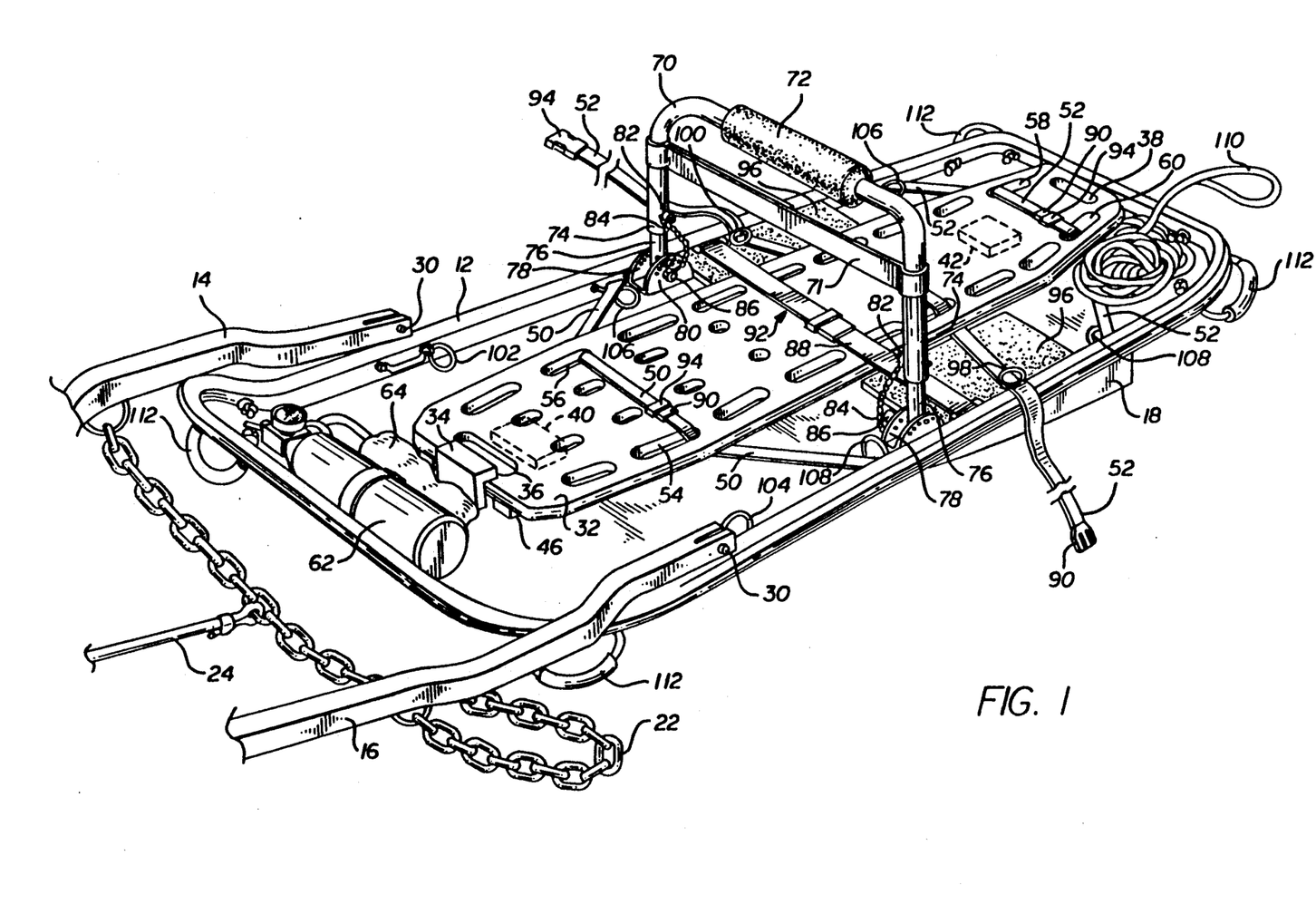
FIG. 1 is a perspective view from the top, front of the toboggan.

Bracket 34 is located towards the front of rescue toboggan 12 and prevents the backboard 32 from moving forward beyond a predetermined position within rescue toboggan 12. The opposite end of backboard 32 is held within the rescue toboggan by the rear portion of the rescue toboggan. In this manner, movement of backboard 32 towards the front of rescue toboggan 12 is limited by bracket 34, movement of backboard 32 towards the rear of rescue toboggan 12 is limited by the rear lip of rescue toboggan 12, and lateral movement of backboard 32 within rescue toboggan 12 is limited by lateral supports 44 and 46 in conjunction with spacers 40 and 42.

Figure 2:
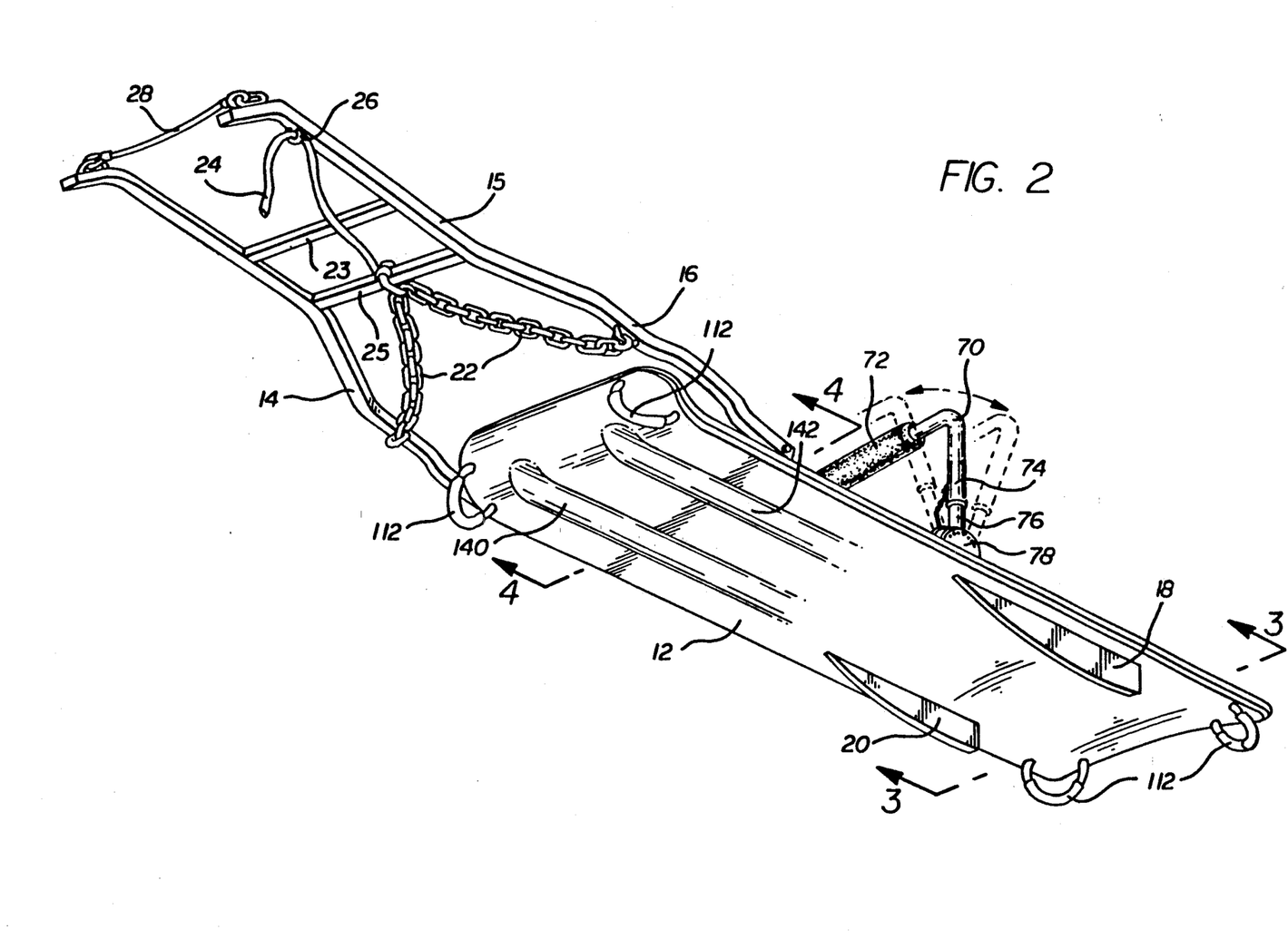
FIG. 2 is a perspective view of the rescue toboggan from the bottom front of the toboggan.

The front portion of rescue toboggan 12 is curved upwards as shown in FIG. 2. Oxygen bottle 62 is preferably mounted near the very front of rescue toboggan 12 on the curved portion of rescue toboggan 12. In this manner, oxygen bottle 62 is slightly elevated off the bottom surface of rescue toboggan 12. A standard regulator and hose arrangement is placed on the end of oxygen bottle 62. Additional hose and a mask, or preferably a demand regulator is located within pouch 64 which is held in place within rescue toboggan 12 by hook and loop fasteners such as "VELCRO", or the like. While a demand regulator is preferred because it enables a single rescuer to actuate a trigger valve and force oxygen from oxygen bottle 62 into the lungs of an injured person, a rescuer must be qualified in order to use a demand type regulator. For this reason, a free flow regulator may be employed by certain resort operators.

A CPR Bracket 70 is preferably located approximately above the midpoint of the backboard 32. CPR Bracket 70 provides a point of physical support for a rescuer that may be kneeling over an injured person who is strapped onto backboard 32. Pads 96 are located slightly behind CPR Bracket 70 and are intended to accommodate the knees of the rescuer. Thus, it is intended that a rescuer kneel on pads 96, lean over CPR Bracket 70 facing the front of rescue toboggan 12, in such a position that the rescuer can readily apply CPR to an injured person, and/or may ventilate an injured person.

A pad 72 is preferably placed across CPR Bracket 70 in order to provide some cushioning between CPR Bracket 70 and the rescuer. In one preferred embodiment, cushioning material 72 and pads 96 are comprised of a closed cell neoprene type rubber pad which has sufficient resilience to provide cushioning to a rescuer. It is recognized that a variety of materials may be used in place of a closed cell neoprene type rubber without detracting from the ability to cushion and, to a lesser degree, insulate the rescuer from the rescue toboggan 12.

A variety of straps in the form of webbing are available to assist the rescuer in maintaining their position within rescue toboggan 12. Straps 88 and 92 can be wrapped over the legs of a rescuer who is kneeling over an injured person within rescue toboggan 12. Straps 88 and 92 can be fastened with quick disconnect fasteners 90 and 94. Additional fasteners 90 and 94 are installed on webbing 50 and 52 to allow the backboard to be readily removed from toboggan 12. Fasteners 90 and 94 are preferably a press to release type fastener of a type typically found on day packs, backpacks, and the like. Alternatively, a hook and loop or "VELCRO" type fastener may be readily employed with portions of straps 88 and 90 covered with a hook or loop type material.

An additional strap 71 is preferably comprised of webbing or other suitable material. Strap 71 is employed to wrap around the hips of a rescuer as the rescuer is kneeling on pads 96 and leaning over CPR Bracket 70. The ends of strap 71 are preferably attached by means of a hook and loop type fastener or "VELCRO" material.

It is recognized that additional straps may be added in order to ensure that the rescuer remains in position within rescue toboggan 12 so that the rescuer may continue to apply CPR, ventilate, or otherwise render aid to an injured person located within rescue toboggan 12. In the embodiment shown, straps 88 and 92 are preferably one inch wide, as is strap 71. It is recognized that wider material, such as a two inch wide section of webbing, may be readily employed. The width of the straps used to hold the rescuer in place is not critical, but the straps should be sufficiently wide so as to comfortably hold the rescuer in place without cutting off circulation or otherwise unduly restricting the rescuer.

It is further recognized that a harness type attachment may be worn by the rescuer and that the harness may be snapped into rescue toboggan 12. A series of loops or D-rings 98, 100, 102, 104, 106 and 108 are available for this purpose. A variety of harnesses may be suitable for use within the rescue toboggan. These harnesses include scuba type harnesses, as well as harnesses which are employed during mountain climbing and other activity where an individual may desire to attach or affix themselves to another individual or apparatus.

Loops or D-rings 98, 100, 102, 104, 106 and 108 are also available to the rescuer in order to attach additional hold down straps to rescue toboggan 12. These additional straps may be placed over the injured person within rescue toboggan 12, or may hold backboard 32 more firmly in place. The general purpose characteristic of these loops or D-rings allows a great deal of versatility in the operation of the rescue toboggan.

The height of CPR Bracket 70 is adjustable. The upper portion of CPR Bracket 70 is formed of a tubular stainless steel material which is held in place by pins 82. In this manner, CPR Bracket 70 may be removed in order to place an injured person who is strapped onto backboard 32 within rescue toboggan 12. The use of pins 82, in order to adjust the height of CPR Bracket 70, readily allows operation of the rescue toboggan by rescuers of a variety of sizes, ranging from small rescuers who may be 5' tall or less to large rescuers who may be 6'4" tall or more, without unduly limiting the usefulness and operation of the rescue toboggan 12.

CPR Bracket 70 may be angularly rotated towards the front or rear of rescue toboggan 12 about pins 86 by adjusting the angular position of struts 76 within housing brackets 78. Struts 76 are held in place within bracket 78 by pins 80 which fit through holes in brackets 78 and struts 76. It is recognized that a latching cam type arrangement may be employed, however, the pin arrangement is preferred in the present invention because of the low temperature operating conditions and the tendency of many ratchet type arrangements to freeze, seize or become permanently open which may allow CPR Bracket 70 to rotate when it is undesirable for CPR Bracket 70 to move, such as when a rescuer is in place and performing CPR on an injured person located within rescue toboggan 12.

Four handles 112 are preferably made of ⅜" diameter rope, or the like, are affixed to each of the four corners of the rescue toboggan 12. These handles readily allow one or more rescuers to lift or otherwise manipulate the position of rescue toboggan 12. This may be especially desirable where rescue toboggan 12 must be carried over a rough terrain where it cannot be dragged or providing points of attachment in order to hold rescue toboggan 12 in a ski lift, or the like. Handles 112 are particularly useful when employed in conjunction with a rescue toboggan which is otherwise smooth in order to allow rescuers who may be working in near freezing conditions to manipulate the position of rescue toboggan 12 without removing protective gear such as gloves, or the like.

A rope 110 is affixed to the rear portion of the rescue toboggan. Rope 110 is approximately 20' long made of ⅜" diameter rope, or the like. This rope allows a rescuer who is following the rescue toboggan downhill to provide additional drag as the rescue toboggan is moving. Rope 110 also allows the rescue toboggan to be lowered from a height of approximately 20'. This is especially useful if the terrain in which an injured person has been injured may be extremely difficult to access otherwise. Rope 110 provides additional versatility to the area and manner in which the rescue toboggan may be employed.

A handle 15 is affixed near the front of rescue toboggan 12. Handle 15 allows a rescuer to manipulate the rescue toboggan and to control movement of the rescue toboggan as the rescuer descends on a snow or ice covered hillside. Handle 15 consists of two longitudinal tubes 14 and 16 which are affixed to rescue toboggan 12 at one end by pin 30. Pin 30 is designed so that the handle 15 may rotate about pin 30 and be placed over or within rescue toboggan 12. Pin 30 may be a bolt and nut arrangement or straight pin with a cotter pin or other attachment to prevent unintended removal of pin 30 from handles 14 or 16 and rescue toboggan 12.

Handles 14 and 16 include a straight portion which is substantially parallel to the sides of rescue toboggan 12, and an angled portion which causes handles 14 and 16 to be closer together at the point of contact with a rescuer than handles 14 and 16 are at the point they make contact with rescue toboggan 12. This type of design is preferable, especially considering the increased width of the rescue toboggan, to allow a rescuer to maintain substantial control over the direction of travel of the rescue toboggan. This same narrowing characteristic may be readily applied to conventional rescue toboggans in order to allow a rescuer to steer the toboggan from a narrower set of handles.

Handle 15 includes cross support members 23 and 25 in one embodiment of the present invention. Cross support members 23 and 25 provide a crosswise support in order to prevent torsional movement of one of the longitudinal support arms with respect to the other. Cross supports 23 and 25 also ensure the structural integrity of handle 15 and allow a rescuer to more readily control the direction of travel of rescue toboggan 12.

Handle 15 is preferably comprised of a 1" square stainless steel tubing which is up to ¼" thick. All of the fixtures and metal employed in the rescue toboggan is preferably a high grade stainless steel, such as millstandard 318 stainless.

In one embodiment of the present invention, a rope handle 28 preferably comprised of ⅝" diameter rope or the like is affixed between longitudinal supports 14 and 16 in the front of handle 15. This rope handle provides a point of contact between the rescuer and handle 15 of rescue toboggan 12. This allows a rescuer to place rope handle 28 against his back, hips or other preferred area in order to control the speed and direction of rescue toboggan 12 without requiring the rescuer to hold onto handle 28 or handle 15 with the rescuer's hands. This allows the rescuer more versatility than the rescuer may otherwise have.

A braking chain 22 is attached to longitudinal supports 14 and 16 in the front of rescue toboggan 12. A rope 24 is fed through a ring or loop located on cross support 23 or 25 if preferred), and allows the rescuer to allow the chain to drag beneath the front portion of the sled to provide added drag and braking to slow the descent of rescue toboggan 12. Rope 24 is preferably fed through a loop or ring 26 which is shown located on longitudinal support 16. The ring 26 may be readily located on longitudinal support 14 in a similar position without any adverse effect.

Rope 24 allows the rescuer to raise drag chain 22 to a position where it is not contacting rescue toboggan 12 and is not providing any additional resistance or drag between rescue toboggan 12 and the snow or ice beneath rescue toboggan 12. This enables a rescuer to more readily control the descent of rescue toboggan 12 under adverse conditions and allows the rescuer a greater amount of versatility in determining whether to employ drag chain 22 to slow the descent of rescue toboggan 12. This enables the rescuer to reduce the drag of rescue toboggan 12 when traversing a gradually sloping area where additional drag may slow the descent of rescue toboggan 12 so that it inhibits efficient rescue of an injured person located within the rescue toboggan 12.

Employing a rope 24 which is fed through ring 26 located immediately behind rope handle 28 allows the rescuer to rapidly control and determine the position of drag chain 22, and either deploy drag chain 22 to provide additional drag to rescue toboggan 12 or raise drag chain 22 and reduce the drag of rescue toboggan 12. It is recognized that drag chain 22 may be attached to rescue toboggan 12 and continue to operate in conjunction with rope 24.

Runners 18 and 20 are preferably located towards the rear portion of rescue toboggan 12. Runners 18 and 20 are most clearly visible in FIGS. 2 and 3. Runners 18 and 20 cut into the snow or ice beneath rescue toboggan 12 and help ensure that rescue toboggan 12 does not slide sideways down a hillside. Allowing toboggan 12 to slide sideways down a hillside may cause the rescuer to lose control of rescue toboggan 12 and result in further and aggravated injuries to an injured person located within rescue toboggan 12. Runners 18 and 20 help ensure that rescue toboggan 12 remains pointed downhill or in a direction that the rescuer steers rescue toboggan 12. Runners 18 and 20 are preferably stainless steel and are approximately ¼" wide.

In the embodiment shown in FIG. 2, the runners are shown located slightly inboard of the outside edge of rescue toboggan 12. In other preferred embodiments, the runners 18 and 20 may be placed at the very edge of rescue toboggan 12 or located slightly outboard of rescue toboggan 12. It is preferred that runners 18 and 20 be spread apart and located towards the outer edges of the rescue toboggan in order to provide added stability to the rescue toboggan. It is possible to locate runners 18 and 20 or a single runner towards the center of rescue toboggan 12, however, this single runner will not provide as much stability as runners 18 and 20 located towards the outer sides of rescue toboggan 12.

The bottom of rescue toboggan 12 is designed so that it contains two concave cavities or channels 140 and 142. The concave cavities begin at the front of rescue toboggan 12 and gradually taper to a flat surface approximately midpoint in the length of rescue toboggan 12. The concave sections 140 and 142 are most clearly visible in FIGS. 2 and 4. Concave sections 140 and 142 are uniquely designed to gradually flatten as weight is added to rescue toboggan 12. This characteristic allows the bottom of rescue toboggan 12 to have a reduced drag when rescue toboggan 12 is empty and an increased drag when an injured person is placed within rescue toboggan 12.

Figure 4:
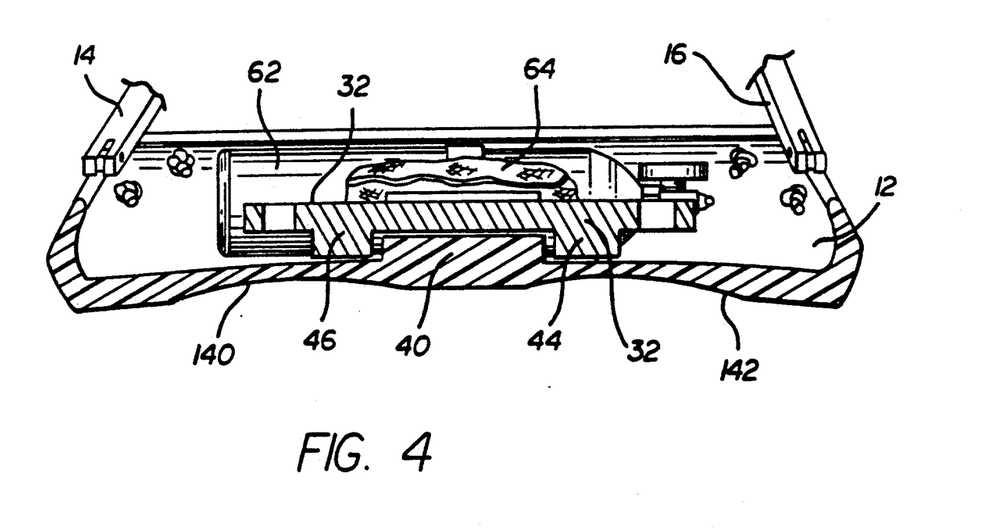
FIG. 4 is a cross section of the front area of the toboggan.

In one preferred embodiment, concave sections 140 and 142 are designed to flatten when a weight greater than 90 lbs. is placed within rescue toboggan 12. The exact weight at which concave areas 140 and 142 flatten and provide additional drag to rescue toboggan 12 may be varied as rescue toboggan 12 is constructed. It is difficult to construct concave sections 140 and 142 so that they flatten at an exact, precise weight.

Concave sections 140 and 142 will gradually flatten as weight is placed within rescue toboggan 12, gradually providing increased drag as the weight within rescue toboggan 12 is increased. Concave sections 140 and 142 are preferably approximately 7" wide and the concave portion is inset approximately 0.187" from the flat, level surface of the bottom of rescue toboggan 12 at the front of rescue toboggan 12 where contact is made with the underlying snow or ice. The depth of the concave cavity decreases until it disappears approximately ⅝ of the way to the back of the toboggan. It is recognized that longer or shorter concave cavities may be employed, as can deeper or shallower concave cavities.

In one embodiment, the rescue toboggan 12 of the present invention is 90.5 inches long and 30.75 inches wide. CPR bracket 70 is located 48.5 inches forward from the back of rescue toboggan 12 and is comprised of 318 stainless steel tubing. Runners 18 and 20 are each approximately 30 inches long. Runners 18 and 20 are set back 38 inches from the front of rescue toboggan 12 and are gradually tapered, having a thickness greater towards the rear of rescue toboggan 12 then towards the front of rescue toboggan 12.

Rescue toboggan 12 is approximately ½ inches deep at the back of rescue toboggan 12 and approximately 4½ inches deep near the front of rescue toboggan 12. The 4½ inch depth of rescue toboggan 12 is measured approximately at the point where spacer 40 is located.

Handle 15 is attached to rescue toboggan 12 approximately 15 inches behind the front of life sled 12 through pins 30. Pins 30 are located approximately on either side of spacer 40. Pins 30 are thread through a metal bracket which is approximately 2 inches high and 2 inches wide and ⅛ inch thick and contains a hole centered in the insert which are approximately 7/16 inch in diameter. Pins 30 are preferably ⅜ inch in diameter.

Concave areas 140, 142 begin approximately 3½ inches either edge of rescue toboggan 12. Concave areas 140, 142 are separated by a flat area which is approximately 9 inches wide and is located approximately midway between the sides of rescue toboggan 12. In one preferred embodiment, the bottom of rescue toboggan 12 has an overall taper which is approximately ⅜ inch deep across the entire width of the rescue toboggan. This overall taper is in addition to the concave areas which have been previously described.

The front or nose of rescue toboggan 12 is curved upwards at an angle of approximately 60°. A D-size oxygen tank 62 is attached to the top surface of the front portion of rescue toboggan 12. Oxygen bottle 62 is clamped in place using a standard releasable clamp. The clamp is bolted through rescue toboggan 12 and attached using ¼ inch diameter nuts and bolts in combination with washers and compression rings.

Rescue toboggan 12 is designed so that there are no sharp edges except for runners 18 and 20. Preferably, all sharp surfaces are curved. Where the back of rescue toboggan 12 meets the sides of rescue toboggan 12, a radius of curvature of 6 inches is employed along the bottom sides of rescue toboggan 12, a radius of curvature of 1 inch is preferably employed.

In one implementation of rescue toboggan 12, bracket 34 is approximately 3 inches wide and is located 77½ inches from the back of rescue toboggan 12. Backboard 32 is preferably 78½ inches long. This allows the front portion of backboard 32 to slide under mounting bracket 34, and allows the back of backboard 32 to fit within rescue toboggan 12. In this implementation, backboard 32 is approximately 18 inches wide. It is recognized that the particular design of the backboard and the dimensions of the rescue toboggan may be altered to allow the use of a standard, off the shelf backboard. This may require a slight modification or redesign of rescue toboggan 12, and may require the use of alternative brackets, such as bracket 34, and spacers in place of spacers 40 or 42. It is recognized that a different type of backboard may be affixed to a rescue toboggan in a slightly different manner which may not require the use of bracket 34 or spacers 40 or 42. Despite any redesign or modification of rescue toboggan 12, the rescue toboggan must be long enough and wide enough to insert a backboard within the confines of rescue toboggan 12, and to allow a rescuer to kneel within the rescue toboggan in order to perform CPR or to administer first aid to an injured person while the injured person is transported by rescue toboggan 12.

It is also recognized that CPR bracket 70 may be partially or fully inclined, and that an injured person may be oriented in a sitting position, leaning against the CPR bracket. This type of situation may be preferably when an individual is having difficulty breathing, or has upper body dislocations or chest injuries. The position and orientation of the injured individual placed within rescue toboggan 12 is at the full and complete discretion of the rescuer who must employ their knowledge of emergency medical treatment in order to determine the best orientation of the injured individual, and the appropriateness or need for a rescuer to ride in the rescue toboggan with the injured person.

Figure 5:
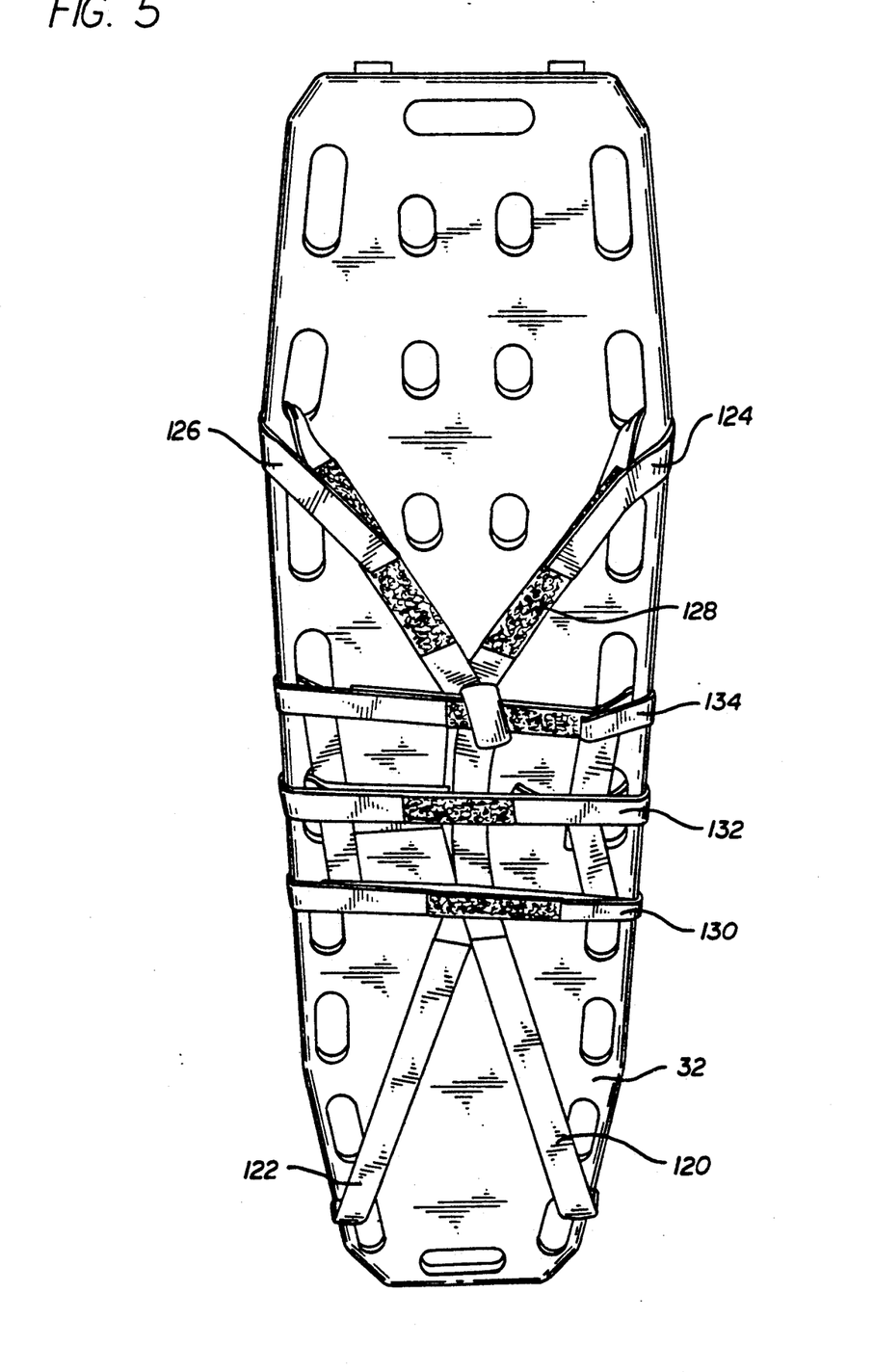
FIG. 5 is a top perspective view of the backboard and with VELCRO webbing.

Backboard 32 is preferably made of laminated wood assembled using wooden dowels, and covered by a varnish or polyurethane protective outer coating in order to prevent moisture penetration. In this preferred embodiment, backboard 32 is X-ray safe, and allows an injured person to be attached to backboard 32 on a hillside, transported within rescue toboggan 12, transferred to an ambulance, and placed in an X-ray machine, if required, without removing the injured person from backboard 32.

This allows an injured person to be rescued and transported to an emergency care facility while minimizing the number of different handling steps that may be required in which an injured person is repeatedly moved or removed from a rescue toboggan, stretcher, or the like. This is especially critical when neck or back injuries may be present in order to reduce or eliminate the chance of aggravating an injury which the injured person has sustained.

Figure 3:
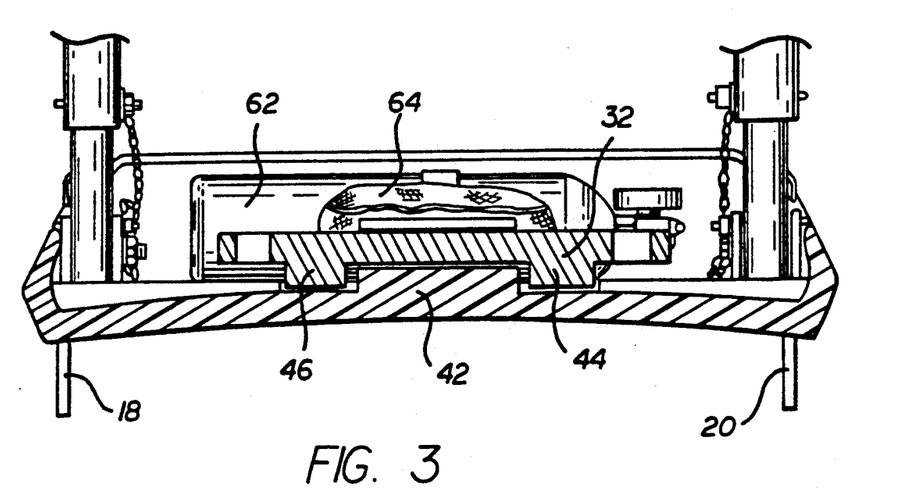
FIG. 3 is a cross section of the rear portion of the toboggan.

As discussed earlier, runners 44 and 46 are located on the bottom side of backboard 32. Runners 44 and 46 allow the backboard to be held in position laterally within rescue toboggan by resting against either side of spacers 40 and 42 within rescue toboggan 12. In one embodiment of the present invention, spacer 40 is approximately 5¼" wide and is centered within rescue toboggan 12 and is approximately 4" long. Spacer 42 is also approximately 5¼" wide as is approximately 3½" long and is also centered between the left and right sides of rescue toboggan 12. Runners 44 and 46 are preferably 1" wide and ¾ high. Runners 44 and 46 also ensure that backboard 32 will not rest flush against the ground or other flat surface, thereby allowing rescuers easy access to the numerous handles and tie down holes located within backboard 32.

This further allows an injured person to be strapped onto backboard 32 without the need to raise one side of backboard 32 in order to gain access to the tie down holes such as tie down holes 54, 56, 58, 60 or the like. A wide variety of sizes and shapes of tie down holes may be readily located within backboard 32 in order to provide points of attachment to tie down straps in order to hold an injured person firmly against backboard 32 and prevent undue movement or jostling of an injured person while the injured person is being transported. Backboard 32 is approximately 1" thick in one embodiment of the present invention.

Backboard 32 may be tied down to rescue toboggan 12 by straps 50 and 52 which may be fed through holes 54, 56, 58 and 60 in order to hold backboard 32 in place within rescue toboggan 12. It is recognized that backboard 32 has a large number of openings and that holes other than holes 54, 56, 58 and 60 may be employed to attach backboard 32 to rescue toboggan 12. Additionally, it is recognized that once an injured person is located on backboard 32, it may be undesirable or impractical to feed tie down straps, such as straps 50 or 52, across the top of backboard 32 beneath the injured person. It is recognized that straps 50 or 52 may be divided into single straps which hold one side of backboard 32 to one side of rescue toboggan 12 and that four or more straps may be employed instead of the two straps which are shown in the embodiment of FIG. 1. The exact manner in which backboard 32 is attached to rescue toboggan 12 is at the discretion of the rescuer, and the method selected will be appropriate depending on the particular injuries of the injured person, the weight of the injured person and the terrain which the rescuer will traverse with the injured person located within rescue toboggan 12.

The backboard is shown in greater detail in FIG. 5 which also shows the extensive tie down strap arrangement which can be used to ensure that an injured person remains stationary on backboard 32. For ease of use, all of the straps are fastened or terminated using hook and loop type fasteners, similar to "VELCRO", or the like. There are four main straps which are employed. Straps 130, 132 and 134 are generally affixed across the sides of backboard 32. Straps 130, 132 and 134 may be all of equal length or may be of varying lengths in order to accommodate a variety of girths of the perspective injured persons. This will allow the flexibility for a rescuer when placing an infant or child on backboard 32 and when placing an overweight individual on backboard 32.

A composite strap arrangement 128 runs longitudinally down backboard 32. Strap ends 120, 122, 124 and 126 are readily visible. This type of strapping arrangement has proven more efficient than single strap arrangement such as straps 130, 132 and 134 when holding an injured person firmly on backboard 32.

Additional straps may be added as required by the rescuer. A series of holes or openings is located around the outer periphery of backboard 32 in order to allow an injured person to be secured at a large number of points along the length of backboard 32 without degrading the structural integrity of backboard 32. Three pairs of smaller holes or openings are shown towards the top of backboard 32. These holes or openings are readily seen between strap ends 124 and 126. These openings are available in order to accommodate a tie down strap which may be applied to an injured person's head in the event of a neck or upper back injury in order to immobilize the head of the injured person and prevent further injury to the injured person during transportation.

All of the straps shown are preferably comprised of a 2" wide webbing which is approximately 1/16" thick. The hook and loop type fasteners occupy approximately 12-18" of the end portions of each of the tie down straps. It is recognized that a greater or lesser area may be readily employed, and that a greater or fewer number of tie down straps may be employed by a rescuer as required by the particular situation and injuries which are presented.

The front portion of rescue toboggan 12, referred to as the nose of rescue toboggan 12, in addition to being sloped upwards to prevent snow, debris or other material from entering the inside of rescue toboggan 12 and holding oxygen bottle 62, has a taper from the center of rescue toboggan 12 towards the sides of rescue toboggan 12. This taper is approximately 3° in one embodiment of the present invention and helps in preventing snow build-up which may otherwise occur at the front of rescue toboggan 12.

The front portion of rescue toboggan 12 is also made narrower than the sides of rescue toboggan 12 in order to allow handle 15 to rest along the sides of rescue toboggan 12 and flex as rescue toboggan 12 is being stirred to the left or right without making contact with the nose of rescue toboggan 12. This is done to avoid damage or undue wear to the front portion of rescue toboggan 12, thus extending the usable life of rescue toboggan 12 and reducing repairs or maintenance which may otherwise be required.

There has been described hereinabove a novel rescue toboggan. Those skilled in the art may now make numerous uses of and departures from the above described embodiment without departing from the spirit and teachings of the present invention which are defined solely by the following claims.

What is claimed is:

1. A rescue toboggan for carrying an injured patient over snow and ice comprising:
   an oversize sled having a top side and a corresponding underside;
   a backboard disposed on the top side of the sled, having sufficient rigidity to support a body weight of the injured patient lying thereon with minimal flexing;
   means for securing said backboard to said sled, disposed on the top side of the sled; and
   a CPR bracket having a generally inverted U-shape with opposite ends, pivotally attached at the opposite ends to the top side of the toboggan and substantially overlying the injured patient.

2. The toboggan according to claim 1, wherein the sled further comprises a front end and a back end, and at least one collapsible concave section disposed proximate tot he front end on the underside.

3. The toboggan according to claim 1, wherein the sled further comprises two front concave sections, extending substantially parallel along a length of the sled proximate to the front end, on the underside.

4. The toboggan according to claim 3, wherein the sled further comprises a back concave section extending substantially along a length of the sled proximate to the back end, on the underside.

5. The toboggan according to claim 4, wherein the backboard includes a cellulose material transparent to an X-ray scan.

6. The toboggan according to claim 5, wherein the sled further comprises a tapered nose at the front end.

7. The toboggan according to claim 6, wherein the toboggan further comprises an oxygen bottle disposed on the sled.

8. The toboggan according to claim 7, wherein the CPR bracket is disposed on the sled at a position corresponding to a midsection of the injured patient.

9. The toboggan according to claim 8, wherein the CPR bracket includes a means for angle adjustment, disposed at the opposite ends, and a means for height adjustment disposed on the CPR bracket.

10. The toboggan according to claim 9, wherein the backboard is comprised substantially of wood.

11. The toboggan according to claim 10, wherein the sled further comprises a runner disposed o the underside along a length of the sled.

12. A rescue toboggan for carrying an injured patient over snow and ice comprising:

a substantially flat sled;

a backboard having sufficient rigidity for carrying the injured patient thereon with minimal flexing, disposed on a top side of the sled;

a CPR bracket having a crossbar and at least one support leg, wherein the CPR bracket is disposed at a position substantially overlying the injured patient; and an adjustment means, disposed on the top side of the sled and connected to the support leg of the CPR bracket, for adjusting an angle of the CPR bracket relative to the sled.

13. The toboggan according to claim 12, wherein the sled further comprises a corresponding underside and concave sections formed in the underside.

14. The toboggan according to claim 13, wherein the underside of the sled further comprises two runners each extending parallel to a length of the sled.

15. The toboggan according to claim 14, wherein the CPR bracket includes a strap for attachment to a rescuer.

16. A rescue toboggan for carrying an injured patient and a rescuer over snow and ice comprising:

an oversized, substantially flat and rectangular shaped sled having a top side and a corresponding underside, and a centerline extending along a length thereof;

a backboard having sufficient rigidity for carrying the injured patient thereon with minimal flexing, disposed on the sled, wherein the backboard includes an X-ray transparent cellulose material;

a CPR bracket having an inverted U shape, comprising a crossbar and two support legs disposed at a position substantially overlying the injured patient;

a strap disposed on the CPR bracket for attachment to the rescuer;

an adjustment means, disposed on the topside of the sled and connected to each support leg of the CPR bracket, for adjusting an angle of the CPR bracket relative to the sled;

two collapsible concave sections disposed in the underside, on opposite sides thereof and parallel to the centerline;

two runners extending from the underside of the sled, wherein each runner is parallel to the centerline and disposed on opposite sides thereof; and at least one oxygen bottle disposed on the toboggan.

* * * * *